United States Patent

Matsubara et al.

[11] Patent Number: 5,838,821
[45] Date of Patent: Nov. 17, 1998

[54] METHOD AND APPARATUS FOR SELECTING COMPRESSION METHOD AND FOR COMPRESSING FILE USING THE SELECTED METHOD

[75] Inventors: Akio Matsubara, Yokohama; Hayashi Taniguchi, Tokyo, both of Japan

[73] Assignee: Ricoh Company, Ltd., Tokyo, Japan

[21] Appl. No.: 615,821

[22] Filed: Mar. 14, 1996

[30] Foreign Application Priority Data

Mar. 14, 1995 [JP] Japan .................................. 7-053847
Feb. 15, 1996 [JP] Japan .................................. 8-028174

[51] Int. Cl.⁶ .................................................... G06K 9/00
[52] U.S. Cl. ........................................ 382/190; 382/239
[58] Field of Search .................................... 382/232, 233, 382/235, 236, 237, 238, 239, 240, 243, 244, 245, 246, 248, 250, 251, 252, 253, 173, 168, 181, 190, 192, 195, 191, 200, 201, 209, 217, 218, 224, 225, 226, 227, 228, 175, 176, 177, 180, 286, 291, 290; 358/464, 261.1

[56] References Cited

U.S. PATENT DOCUMENTS

| | | | |
|---|---|---|---|
| 4,464,650 | 8/1984 | Eastman et al. ................. | 340/347 DD |
| 4,677,479 | 6/1987 | Hatori et al. ..................... | 382/239 |
| 4,901,363 | 2/1990 | Toyokawa ........................ | 382/239 |
| 5,060,286 | 10/1991 | Miller .............................. | 382/239 |
| 5,125,045 | 6/1992 | Murakami et al. ................ | 382/50 |
| 5,138,673 | 8/1992 | Yoshida et al. .................. | 382/239 |
| 5,159,667 | 10/1992 | Borrey et al. .................... | 395/148 |
| 5,335,290 | 8/1994 | Cullen et al. ..................... | 382/9 |
| 5,392,362 | 2/1995 | Kimura et al. ................... | 382/239 |
| 5,491,564 | 2/1996 | Hongu ............................. | 382/239 |
| 5,568,571 | 10/1996 | Willis et al. ..................... | 382/254 |

Primary Examiner—Leo H. Boudreau
Assistant Examiner—Bijan Tadayon
Attorney, Agent, or Firm—Oblon, Spivak, McClelland, Maier & Neustadt, P.C.

[57] ABSTRACT

A method and system for automatically determining a compression method to be used on a file. A histogram of the file is constructed in order to determine if there are a predetermined number of consecutive byte patterns below a set threshold. If this condition exists, the file is not an image file and compression can be performed using the lossless Lempel-Ziv compression method. If, over the range of the histogram, the file is above the predetermined threshold, the histogram is examined to determine if the average value in the histogram is in a central portion of the histogram. If it is not, the file does not represent an image and again, the Lempel-Ziv compression method is used. If both the byte patterns and the histogram exceed the predetermined threshold and the average of the histogram is in a central portion, the file is determined to contain an image. Based on the gradation or number of bits necessary to represent the byte patterns of the file, an appropriate image compression method is used to compress the file.

49 Claims, 15 Drawing Sheets

METHOD AND APPARATUS FOR SELECTING COMPRESSION METHOD AND FOR COMPRESSING FILE USING THE SELECTED METHOD

BACKGROUND OF THE INVENTION

1. Field of the Invention

The present invention relates to automatically selecting a data compression method based on the characteristics of a file to be compressed. The invention is more particularly related to analyzing a histogram of byte patterns making up a file in order to determine an appropriate compression method. The invention is still further related to compressing the file after the compression method has been selected.

2. Discussion of the Background

As technology improves, data processing systems such as personal computers become more powerful and can process varying types of files including multimedia files. For example, a conventional personal computer has the ability to execute or process application programs, text files encoded using ASCII codes or varying word processor formats, font files such as vector (outline) fonts or bit-mapped fonts, or image files encoded using known compression methods such as JPEG, MPEG, TIFF, or any other image compression format.

In order to make the most efficient use of file storage space and to reduce transmission time, raw data is encoded or compressed to reduce the size of the file. Conventionally, a user selects the coding method which is appropriate. As the number of compression methods increases, it is difficult for the user to know the optimum encoding or compression method which is to be used.

One known method of automatically selecting a compression method is found in facsimile machines. When a communication protocol is selected by the facsimile machines, one of a modified Huffman (MH), modified read (MR), and modified modified read (MMR) known compression methods is usually selected and used for the facsimile transmission. However, the compression or encoding method in conventional facsimile machines is selected without regard to the content of the information to be transmitted.

SUMMARY OF THE INVENTION

Accordingly, one object of this invention is to provide a novel and efficient method, system, and software for analyzing characteristics of files within a data processing system without receiving a file type designation from a user.

It is another object of this invention to provide a method and system for selecting a data compression method using the characteristics which have been determined.

It is a further object of this invention to provide a method and system which selects the compression method which achieves the highest compression ratio and preserves the qualities of the data file, as desired or required.

These and other objects are accomplished by a method and system which analyzes a histogram of byte patterns contained in a file. As an example of how the histogram is constructed, suppose eight bit bytes are used to represent the contents of a file. The byte values resulting from an eight bit representation are between 0 and 255. When constructing the histogram, each time there is an occurrence of a byte pattern, the value within the histogram for that byte pattern is increased by one. All byte patterns of the file are processed in this manner to construct the histogram.

After a file is obtained, for example, by scanning an image, receiving the image from a communication interface such as through a modem or network, or from a file contained on a medium such as a floppy, optical or other type of disk, the histogram is first processed in order to eliminate stray values from each end. For example, the information which is analyzed is between the average, plus or minus three times the standard deviation of the histogram and the information outside of this range is not evaluated.

This histogram is then analyzed to determine if there are a number of consecutive portions below a predetermined threshold. This predetermined threshold is preferably between 1 and 3 occurrences of the byte patterns in question, although any threshold can be used, depending on the size and other characteristics of the file. The number of consecutive byte patterns which is below the predetermined threshold which is acceptable is three, for example. Therefore, if there are three or more consecutive byte patterns within the range of byte patterns being examined which are below the predetermined threshold, it will be determined that the file is not an image file and the best encoding method is, for example, the Lempel-Ziv encoding method.

If the histogram is analyzed and it is determined that it is above the threshold over the range being examined, meaning there are not more than the predetermined number of consecutive byte patterns having a count less than the threshold, the file can possibly be an image file. A further test is then performed to examine if the histogram has the byte patterns primarily in a central location of the histogram. If the byte patterns are not in a central location, the file is not an image file and compression of the file is performed according to the Lempel-Ziv method. If the byte patterns are above the threshold and arranged around the central portion, then the gradation of the file is examined in order to determine if the file, which has been determined to be an image file, should be compressed using the JPEG compression method or the JBIG compression method.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
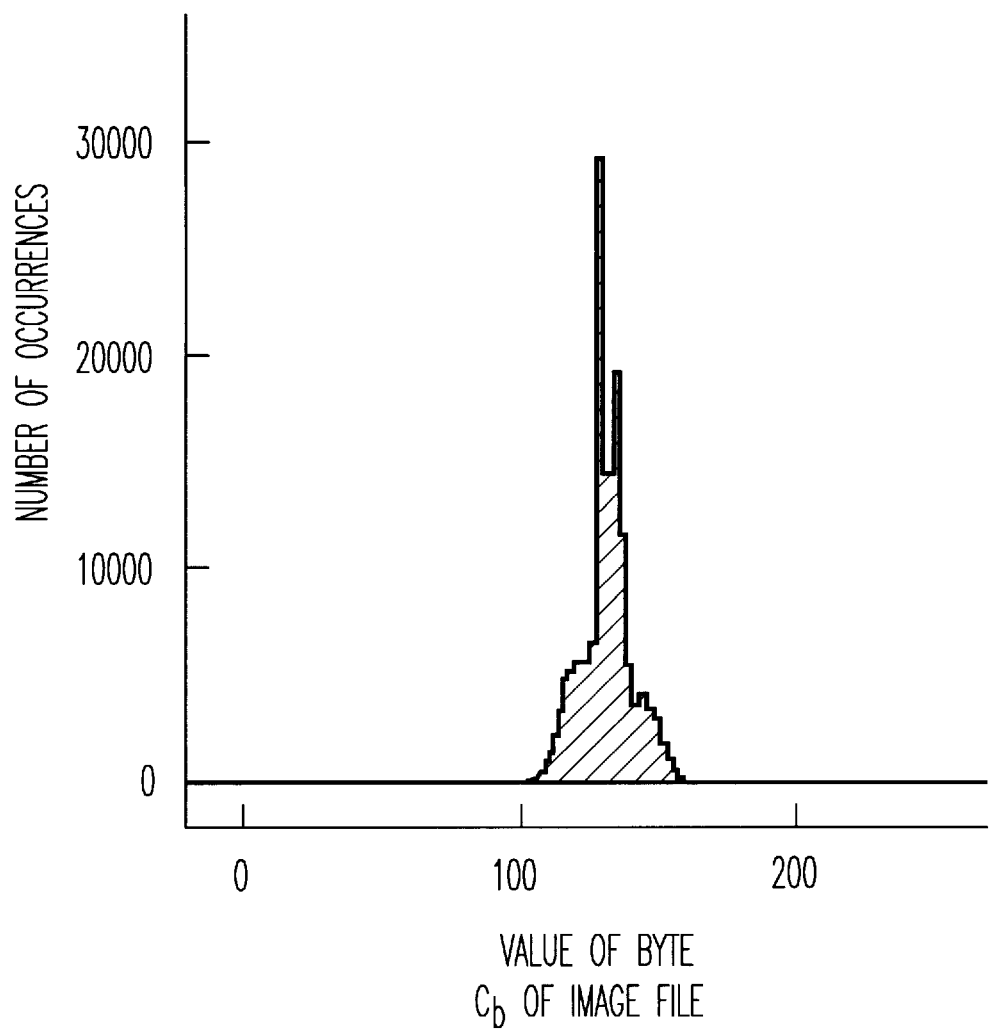
FIG. 1 illustrates a histogram of the color difference portion Cb of an image file.

Referring now to the drawings, wherein like reference numerals designate identical or corresponding parts throughout the several views, and more particularly to FIG. 1 thereof, there is illustrated a histogram of the byte values occurring within an image file. More particularly, the histogram is of the blue color difference signal Cb of an image represented by a luminance and two color difference signals. The manner of creating a representation of an image using a luminance and two chrominance signals is well-known and not explained herein in order not to obscure the explanation of the invention.

The byte patterns which are used as examples herein are all eight bit bytes. Of course, it is possible to have a larger numbers of bits such as sixteen bits to represent components within a file and the exact number of bit used to represent components of a file is not important. Assuming that eight bits are used to represent the components within a file, the eight bits are used to represent values between 0 and 255. The histograms used by the invention are generated by examining the number of occurrences of each bit pattern making up the bytes. For example, taking the bit pattern 01000000 which is the binary representation of 128, the histogram in FIG. 1 has a value of approximately 30,000. This means there are 30,000 occurrences of the bit pattern 128 occurring within the file. In order to fully construct the histogram, the file is analyzed to determine the number of times each bit pattern (byte value) occurs by counting the number of occurrences of each bit pattern and constructing a histogram having the format of FIG. 1. A histogram is a representation of a frequency distribution, in this case of byte values. The histogram which is constructed is not necessarily stored in graphical form within a computer operating according to the present invention but it is necessary to store or analyze the number of times each byte value occurs.

Figure 2:
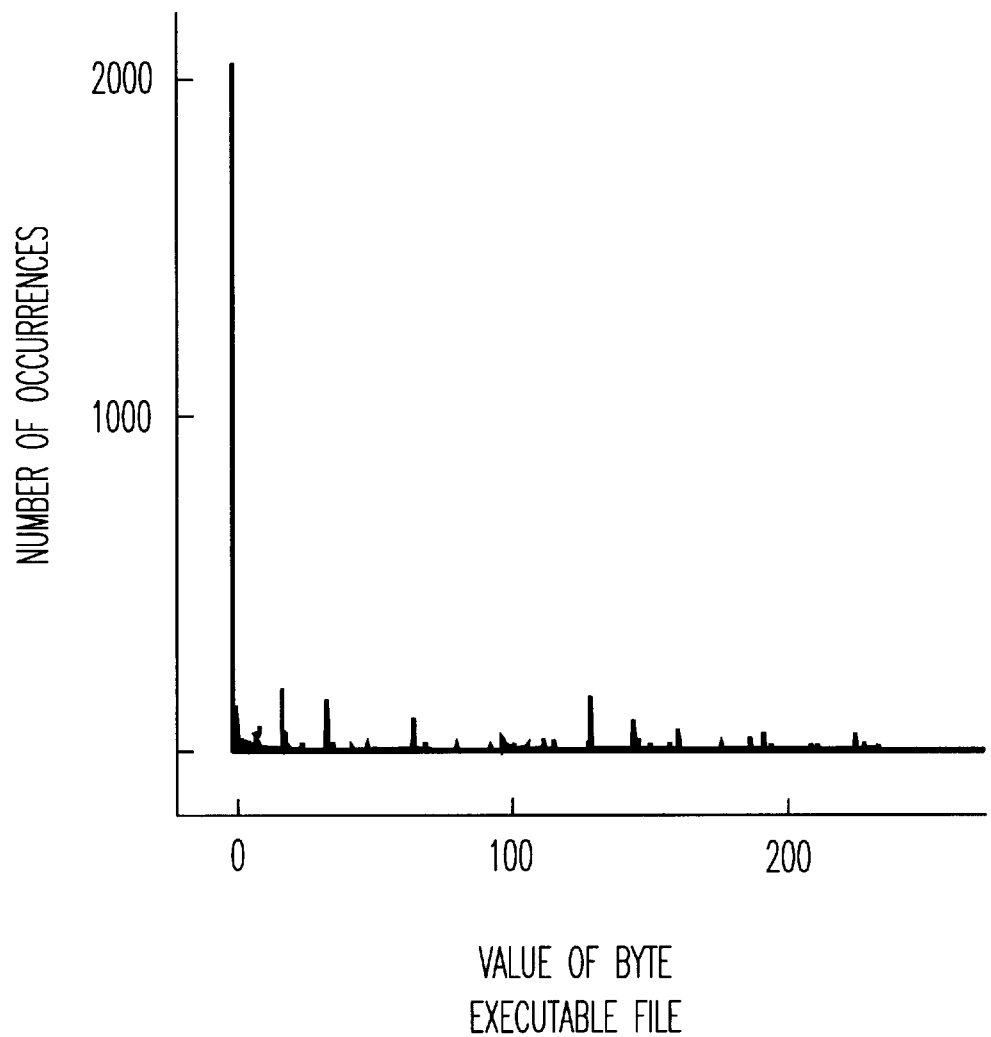
FIG. 2 illustrates a histogram of the byte patterns occurring within an executable file.
Figure 3:
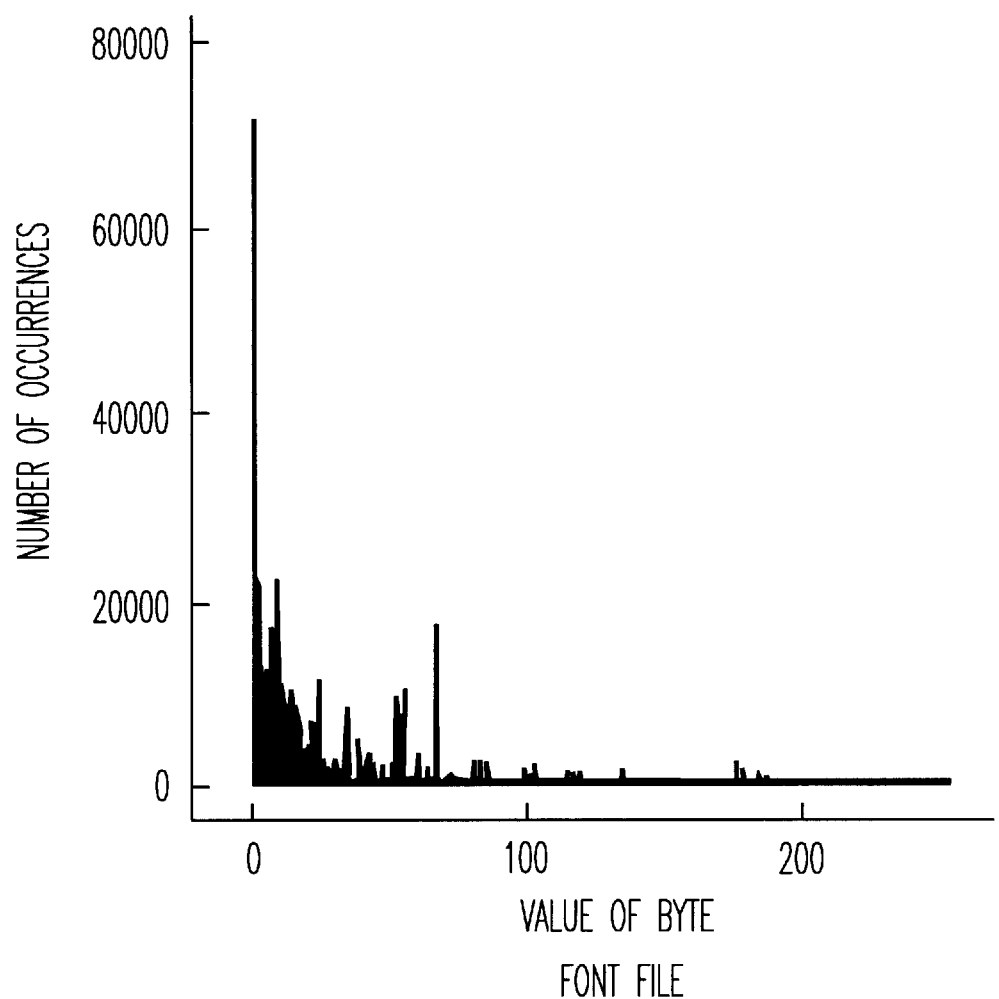
FIG. 3 illustrates a histogram of the byte patterns occurring within a font file.

The present invention was developed by the inventors' analysis of the histograms of various file types. Through experimentation, the inventors noticed that an image file usually has the bytes occurrences grouped around a central portion and above a predetermined threshold. The inventors also constructed a histogram of a typical execution file, as illustrated in FIG. 2, and found the occurrence of byte patterns to be fairly discontinuous and spread out over the range of byte values. When examining font files, an example of which is illustrated in FIG. 3, the byte values occurring therein were found to be above a predetermined threshold at the beginning portion thereof but the majority of byte patterns occurred on the left side of the histogram and not in the central portion. The histogram illustrated in FIG. 3 is of a Microsoft True Type font of Japanese characters.

After studying the characteristics found in histograms of various types of files, the inventors were able to determine a general criteria which allows an automatic classification of the type of file based on the byte patterns occurring therein. The inventors found that if the histogram had values which stayed above a predetermined threshold, then the file might be an image file. However, it was not absolutely certain that the file was an image file if there was a portion above a predetermined threshold because the file could be a font file. The inventors discovered that image files have an average byte value located at a central portion thereof.

It is important to the present invention to use an encoding or compression method which would not lose critical information due to the compression process when it is essential that file information not be lost. The inventors found that a lossy compression process such as JPEG was acceptable for image files and provided good compression. However, this type of compression is not acceptable for font files as there is information within a font file which cannot be lost through the compression process, meaning the compression process must be completely and perfectly reversible for font files. Similarly, the compression must be completely reversible for executable and text files.

Therefore, the inventors found that even if a file has portions above a predetermined threshold, a further test can be performed such as testing if the byte patterns of the file are arranged in a central portion in order to more definitely distinguish between non-image and image files.

Based on the above work which lead to the discovery of the properties of the various types of files, the present invention was developed which allows a proper automatic determination of an appropriate compression method. Before explaining the details of the operation of the invention with respect to the flowchart illustrated in FIG. 6A–6D, a description of some of the features used to determine file type by the present invention will be discussed with respect to FIGS. 4 and 5.

Figure 4:
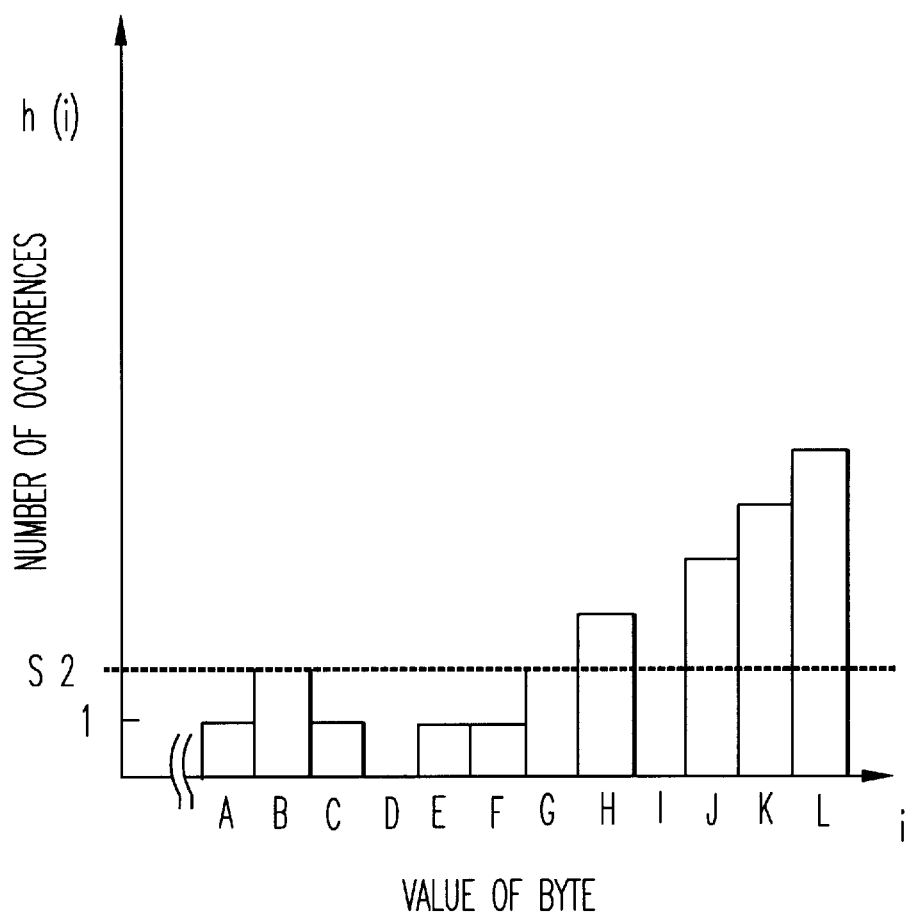
FIG. 4 illustrates an exemplary histogram having a threshold of S=2 utilized for explaining the operation of the invention.

FIG. 4 is an exemplary histogram for consecutive byte values within a file between the values of A and L. These values between A and L are for exemplary purposes only and the exact byte values thereof are not important and are used to explain the general principals of the invention.

In FIG. 4, the vertical axis h(i) is the value of the histogram for the byte i. In FIG. 4, a horizontal line at h(i)=2 has been drawn and this is the predetermined threshold S for this example. This threshold S is used to determine whether the file can possibly be an image file. If the file is an image file, most of the file will have a value which is greater than or equal to S. If there are a predetermined number of consecutive values of the histogram below X, meaning h(i) is less than or equal to 2, the file cannot be or probably is not an image file.

As a specific example, suppose that it has been determined through experimentation that if there are three or more consecutive occurrences below the threshold 2 within the histogram, the file cannot be an image file. In FIG. 4, it is seen that the values C–F are each below 2 and the invention would determine that a file having this histogram cannot be an image file. However, assuming that five occurrences of a value less than the threshold S are permitted before the file is determined not to be an image file, as it is seen that as FIG. 4 does not have five consecutive occurrences below two, the file can be determined to be an image file.

Figure 5:
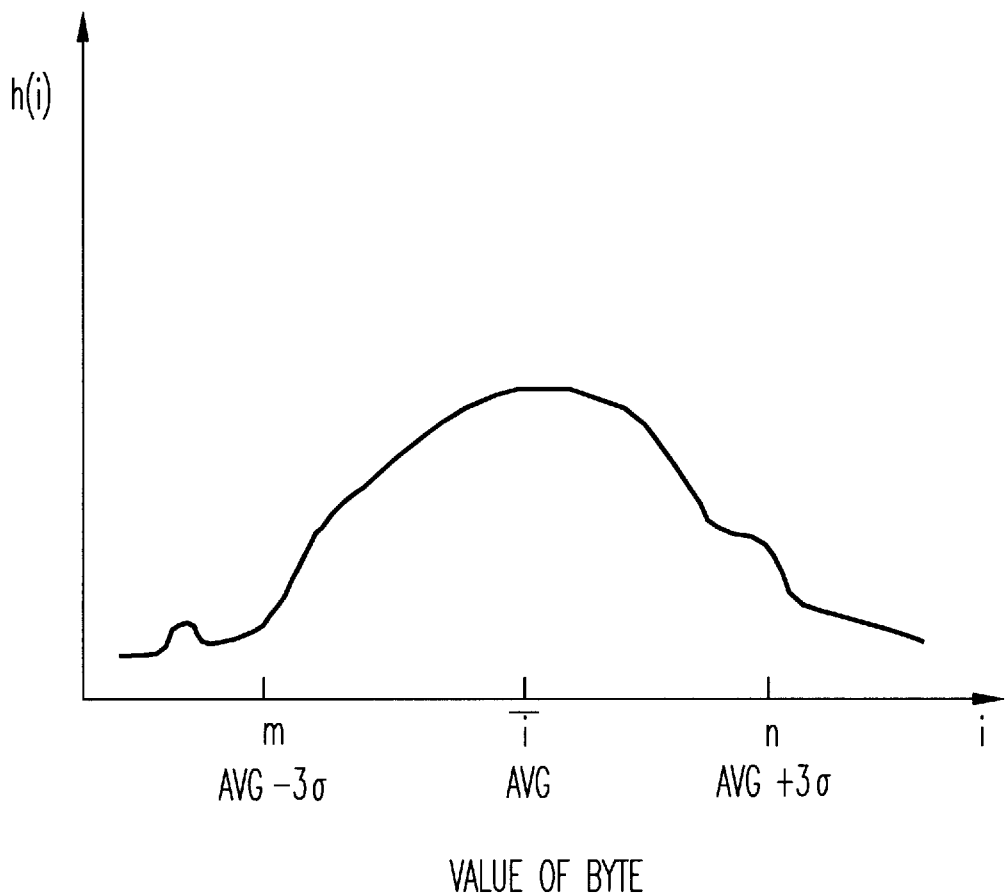
FIG. 5 illustrates the manner of obtaining the minimum, m, and the maximum, n, used to limit the portion of the histogram to be analyzed.

The present inventors have also found that some abnormalities may occur at the lowest and highest byte values of the histogram. The inventors have determined, through experimentation, that better results can be obtained by ignoring the end portions of a histogram. Through experimentation, the inventors have determined that the histogram can be analyzed over a range between the average value of the histogram, $\bar{i}$, plus or minus three times the standard deviation ($\pm 3*\sigma$), as illustrated in FIG. 5. If the average value, plus or minus three times the standard deviation is off of the histogram (e.g., less than zero or greater than 255), the end byte value on the histogram will be used. For example, if the average minus three times the standard deviation is less than zero, the left most value of the histogram which will be analyzed is i=0. While the average, plus or minus three times the standard deviation is the preferred range to evaluate the histogram, the present invention should not be construed as being limited to this range of the histogram but other ranges or the entire histogram can be utilized, as desired.

Turning now to the flowchart illustrated in FIG. 6A–6D, the process of the present invention begins by first calculating the average value, $\bar{i}$, of the byte patterns contained within the histogram and also calculating the standard deviation, σ, of the histogram in step 102. The present invention operates by examining the byte patterns of the histogram except the byte patterns at the ends of the histogram are ignored in some cases. This is done by examining the byte patterns in a range between m and n, m being the minimum or lower limit which is the average $\bar{i}$ minus three times the standard deviation, and n being the maximum or upper limit which is the average plus three times the standard deviation. The minimum m is calculated in step 104 and the maximum n is calculated in step 106.

The process of the invention operates utilizing two variables or counters. A first counter, k, is used to indicate a starting point from which the counting of consecutive values below a predetermined threshold begins. In step 108, this counter k is set to be the minimum value, m, of the byte pattern to be considered which was calculated in step 104. Flow then proceeds to FIG. 6B where step 110 sets a second counter used by the present invention to count the number of consecutive occurrences within the histogram which are below a predetermined threshold to one. This is accomplished by setting the counter, j, equal to one.

Step 112 then determines if the end of the file has been reached by determining if the quantity (k+j) is greater than n. If the result of the check of step 112 is yes, all byte patterns within the histogram which are of interest have been checked and a predetermined number of consecutive byte patterns below a threshold value have not occurred, indicating that the file might be an image file. Flow will proceed to process B in FIG. 6C to perform further testing on the file. If step 112 determines that the end of the file has not been reached, step 114 determines if the current position in the histogram is below a predetermined threshold. This is determined by checking if h(k+j) is less than S, S being as illustrated in the diagram of FIG. 4. If a relatively large file is being examined, the threshold, S, can be set to a smaller value than when the file being examined is smaller in size. The exact value of S can be optimally determined through experimentation and the present inventors have found that the threshold S can be set to three, for example. If step 114 determines that the histogram is not below a predetermined threshold, flow proceeds to step 116 which moves the counting position k up to the current position by setting k equal to the current value of k+j. From step 116, flow proceeds back to step 110 which resets the value of j to one.

Alternatively, if step 114 determines that the current value of the histogram is below the predetermined threshold S, flow proceeds to step 118 which determines the number of consecutive byte values which are less than a threshold. In this case, the counter j is compared to determine if j is less than l (lower case "L"). The present inventors have found that for larger files, l can be set to 1, whereas for smaller files, l can be set to two or three. The preferred value of l will best be determined by experimentation, depending on the configuration of the system. If step 118 determines that the number of consecutive byte values which are less than the predetermined threshold S are not less than a predetermined quantity (j is not less than l), flow proceeds to step 120. In this case, because there are too many consecutive byte patterns which are less than the predetermined threshold, S, the file has been determined not to be an image file and will be most optimally compressed using the Lempel-Ziv compression method (or variation thereof) disclosed in U.S. Pat. No. 4,464,650, which is incorporated herein by reference. The Lempel-Ziv encoding method is based on a dictionary look-up system. If step 118 determines that the counter j is less than the predetermined quality l, the counter j which counts the number of consecutive byte patterns in the histogram having a value less than the predetermined threshold S is incremented in step 122 and flow proceeds back to step 112.

Figure 6A:
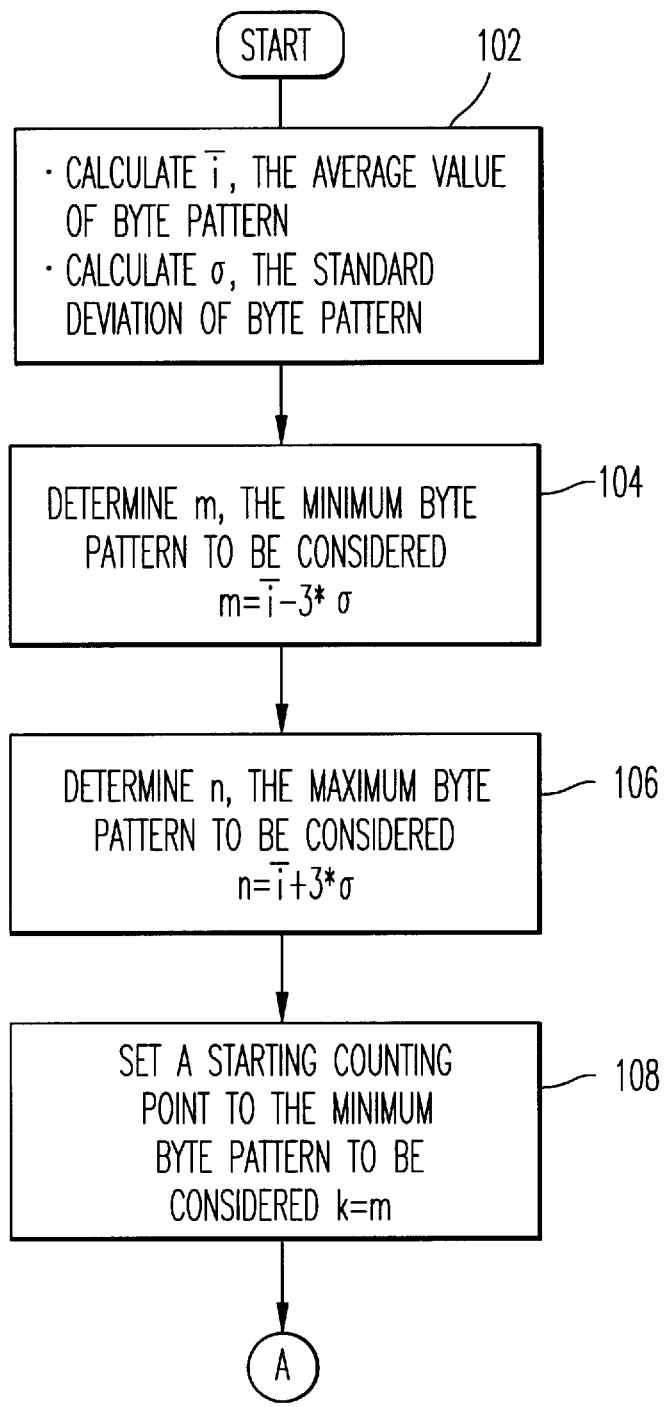
FIGS. 6A–6D are a flowchart used to analyze a histogram of the byte values of a file to determine the compression method to be used for the file.
Figure 6B:
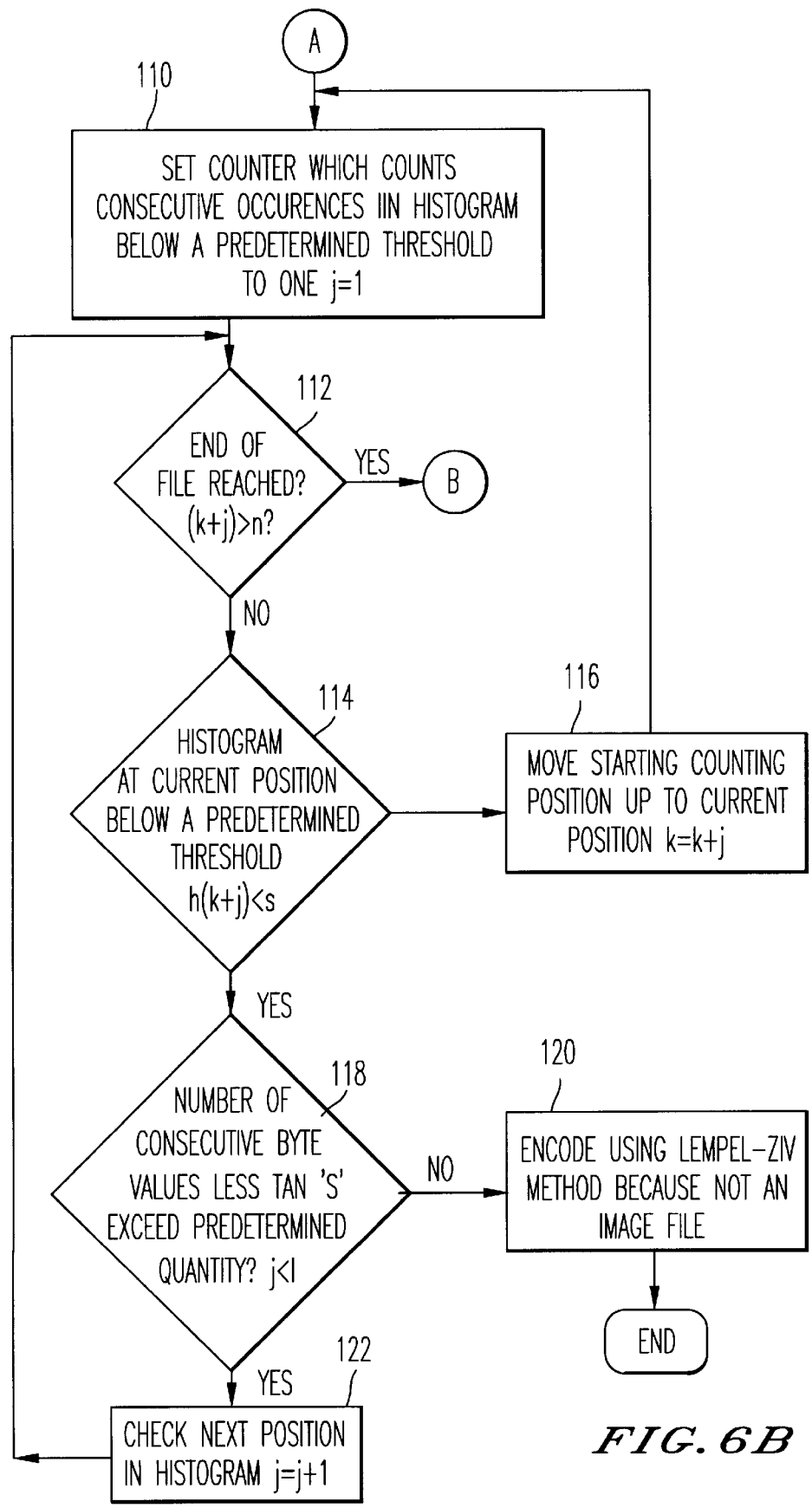
Figure 6C:
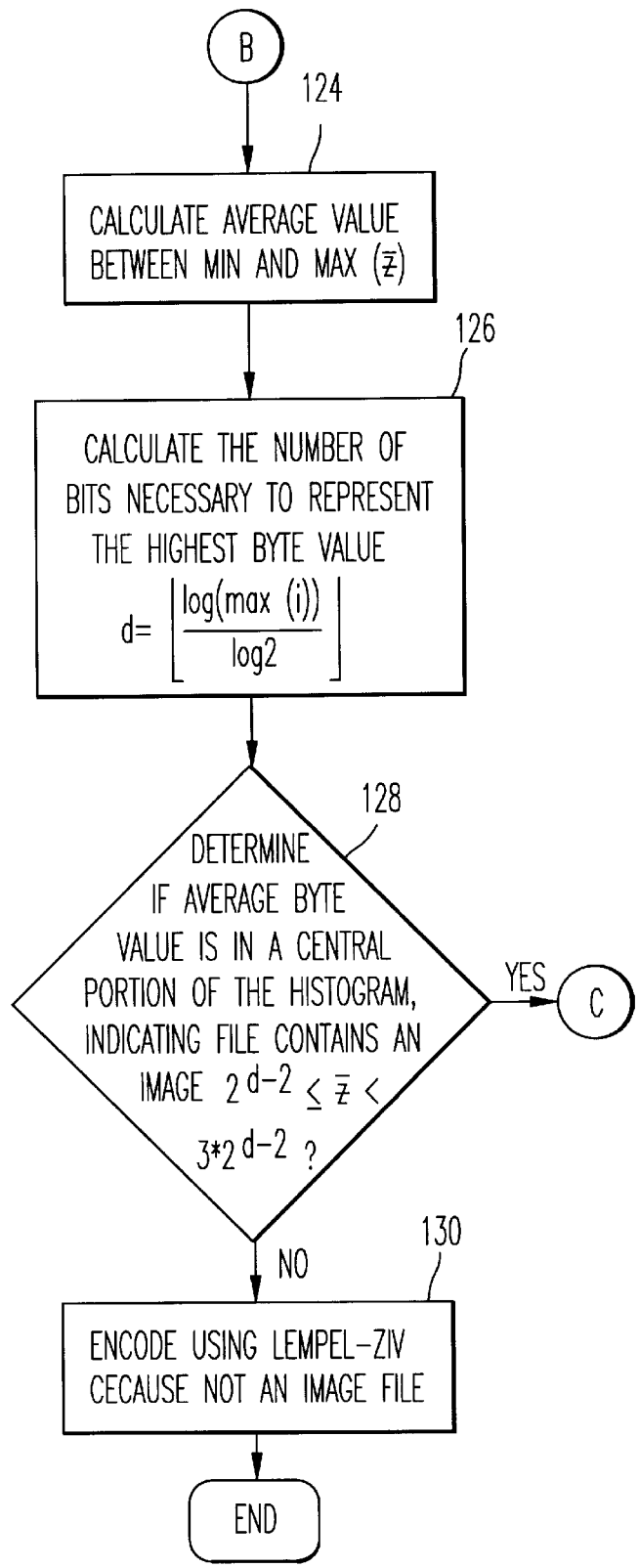

When step 112 determines that the end of the file has been reached, it is possible that the file is an image file. However, further checking must be performed to determine if the file is in fact an image file using the steps illustrated in FIGS. 6C and 6D. In FIG. 6C, step 124 calculates the average value $\bar{z}$, between the minimum m and the maximum n. This is calculated using the formula:

$$\bar{z} = \frac{\sum\limits_{i=m}^{n} i*h(i)}{n-m+1} \tag{1}$$

Next, step 126 calculates the number of bits necessary to represent the highest byte value. This is performed by taking the log of the maximum value of i and dividing this value by log 2. After the division is performed, the value is rounded up to the next integer. For example, when the maximum value of i is 127, d=7 and when the maximum value of i=129, d=8 because 8 bits are necessary to represent number having a value of 128 or higher. As an alternative to step 126 utilizing the log (MAX(i)), log n can be used if desired.

Step 128 then determines if the average value $\bar{z}$ is in a central portion of the histogram. A preferred way of determining if the average is within-a central portion of the histogram is utilizing the formula:

$$2^{d-2} \leq \bar{z} < 3*2^{d-2} \tag{2}$$

As an example, when eight bits are necessary to represent the highest byte value in the histogram (d=8), the average value must be between 64 and 192. When d=7, the average value must be between 32 and 96. If the average value is within the range defined by equation (2), the average value is considered to be centered, thus indicating that the file is an image file. The important part of step 128 is determining if the average file is in a central portion of the histogram and any desired manner can be utilized to determine if the average is within a central portion. Other limitations defining the central portion can be determined as desired using experimental results obtained by analyzing varying file types. Further, the range or width of the central portion can be made narrower or wider, as desired. If step 128 determines that the average is not in a central portion, the file is determined not to be an image file and step 130 performs encoding of the file according to the Lempel-Ziv method and the process of the flowchart then ends. If step 128 determines that the average is within a central portion of the file, flow proceeds to process C illustrated in FIG. 6D.

Figure 6D:
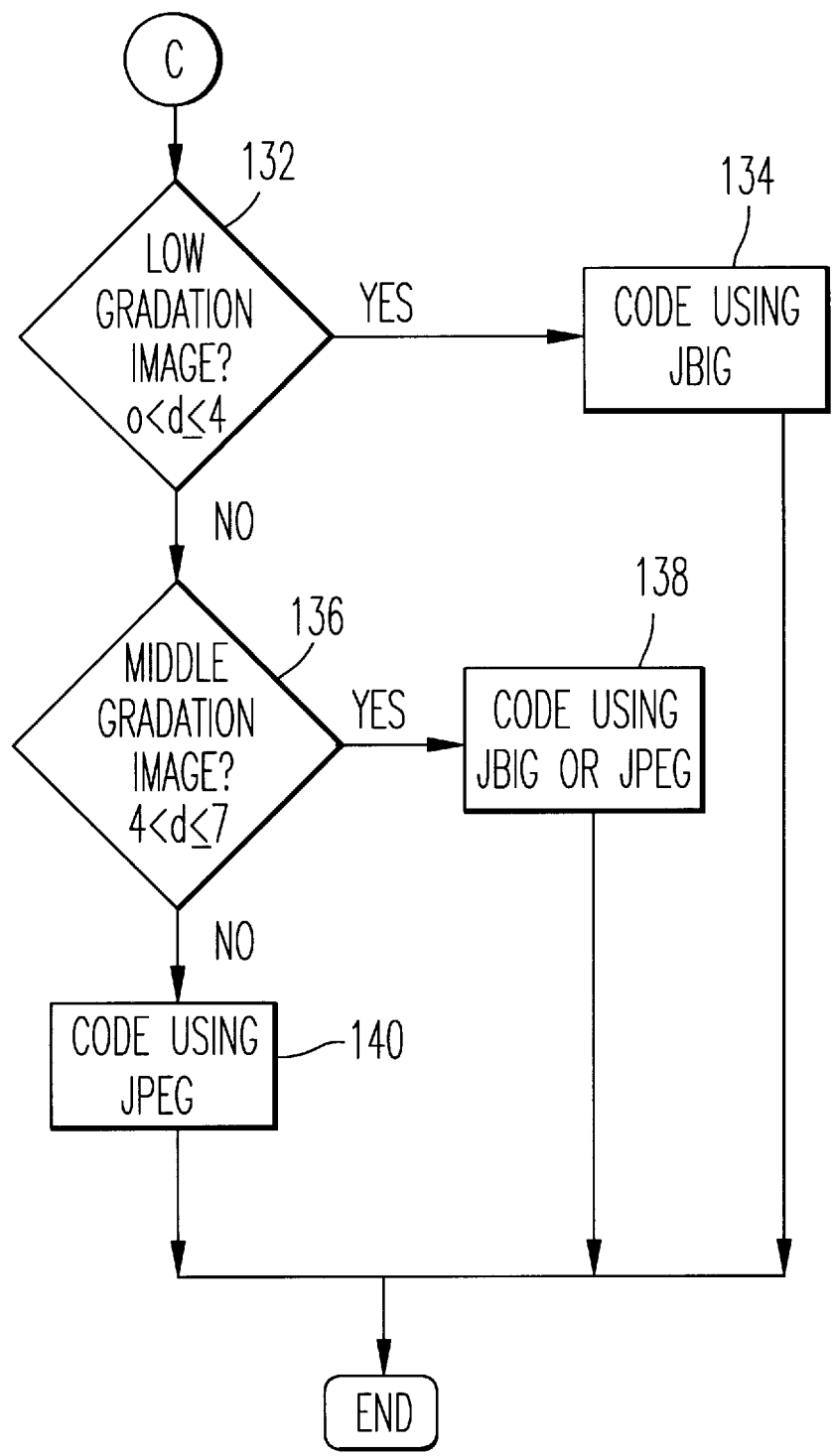

In FIG. 6D, step 132 examines if the file, which has already been determined to be an image file, contains a low gradation image. This is determined by examining d, the number of bits needed to represent the byte patterns of the image. The inventors have found that when one to four bits are used to represent the image, the known process of JBIG image compression, as defined in ISO/IEC IS 11544, which is incorporated herein by reference, should be used as is done in step 134. The JBIG encoding or compression method is best suited for coding binary or low gradation image files, achieves a high compression ratio for these files, and preserves the quality of the image as this is a non-lossy or reversible image coding method.

When the number of bits, d, necessary to represent an image is less than 4, flow proceeds to step 136 which determines if this is a middle gradation image. When d is 5, 6 or 7, flow proceeds to step 138 which uses either JBIG compression, or JPEG compression, as defined in ISO/IEC IS 101918-1, which is incorporated herein by reference, which is a lossy image coding method. When d is 5, 6 or 7, either JBIG, or JPEG is preferable and either may be used, depending upon the desires of the user or the characteristics of the file, or determined through experimentation to see which is the best method. When eight or more bits are used to represent the image, flow proceeds from step 136 to 140 which encodes the image using the JPEG compression method. The process of the invention then ends.

Figure 7:
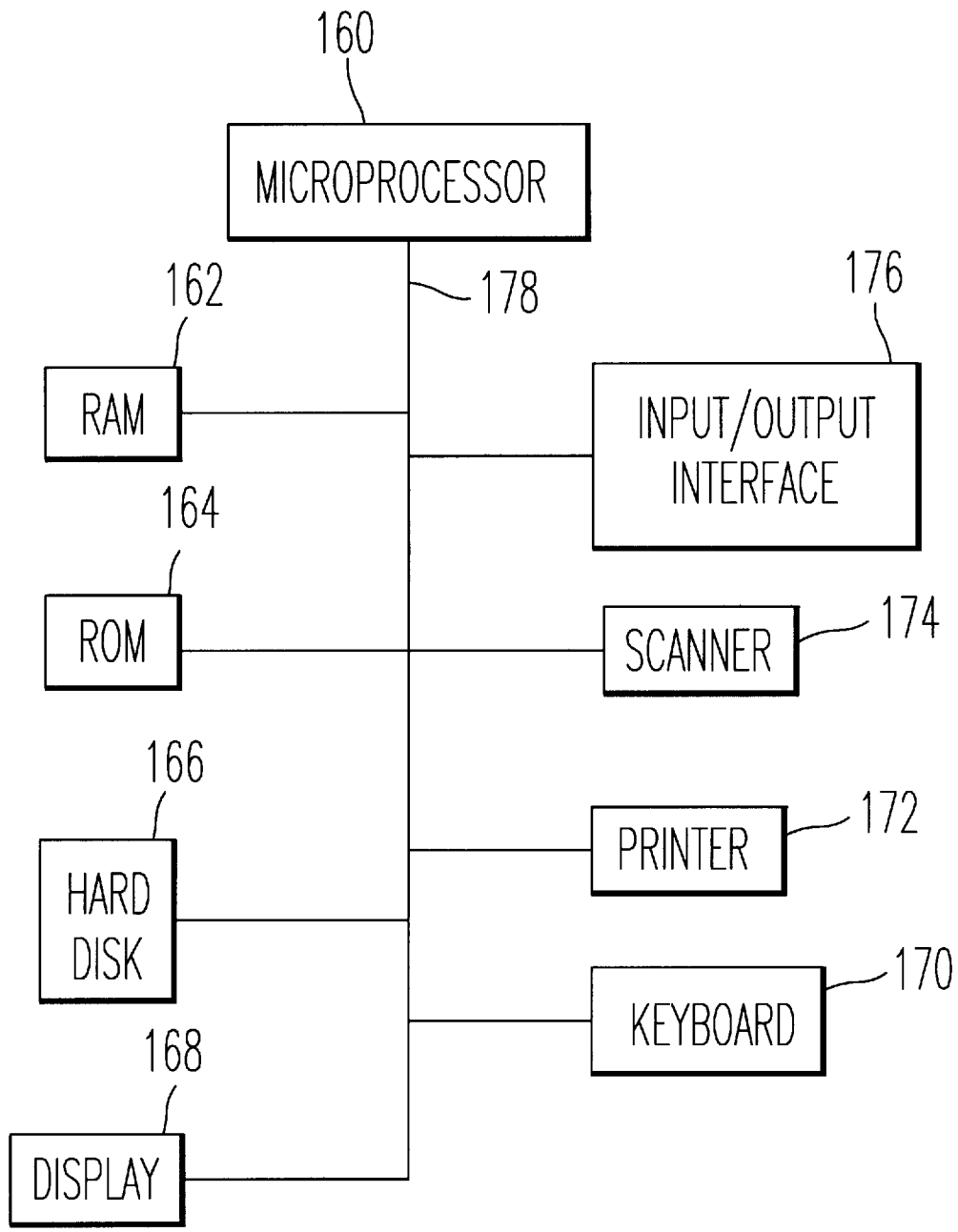
FIG. 7 is a block diagram of a hardware embodiment of the present invention implemented as a general purpose computer.

FIG. 7 illustrates an exemplary hardware embodiment of the present invention. In this embodiment, the invention is implemented utilizing a microprocessor 160 which performs the processing of the invention. A random access memory 162 is utilized as a working area for the microprocessor and a ROM 164 stores various routines utilized by the microprocessor. Routines which may be stored in the ROM 164 include the various image compression methods such as the Lempel-Ziv method, the JPEG method, or the JBIG method. A hard disk 166 is used to store the files in both compressed and uncompressed forms. There is a display 168 and a keyboard 170 to control the system illustrated in FIG. 7. A printer 172 is utilized to print out information as desired, and a scanner 174 is used to obtain image files. The scanner can also be utilized to scan in textual information. An input/output interface 176 is used to communication information into and out of the system illustrated in FIG. 7 and can be implemented using a modem, a local area network interface, a wide area network interface, an interface to the internet, or any other input/output communication interface. The components illustrated in FIG. 7 are connected using a system bus 178.

Figure 8:
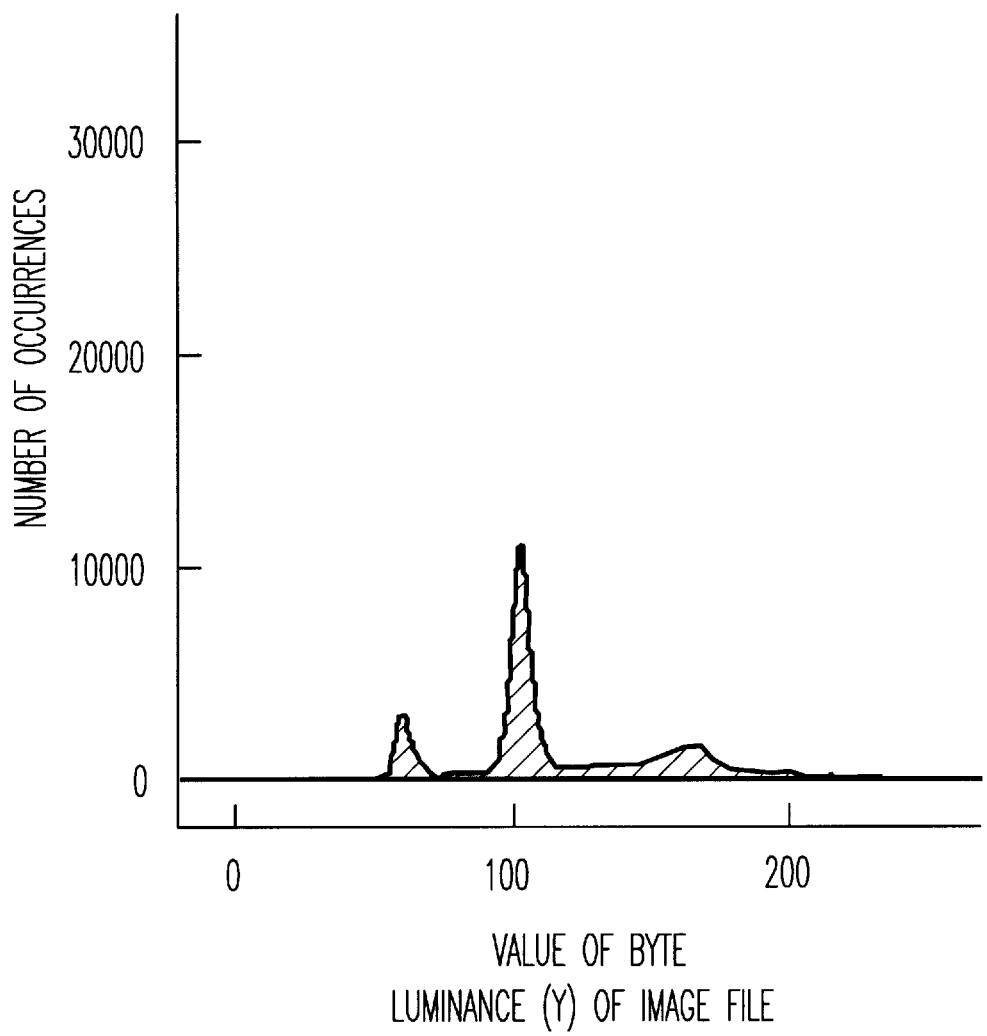
FIG. 8 is a histogram of the luminance component of an image file.
Figure 9:
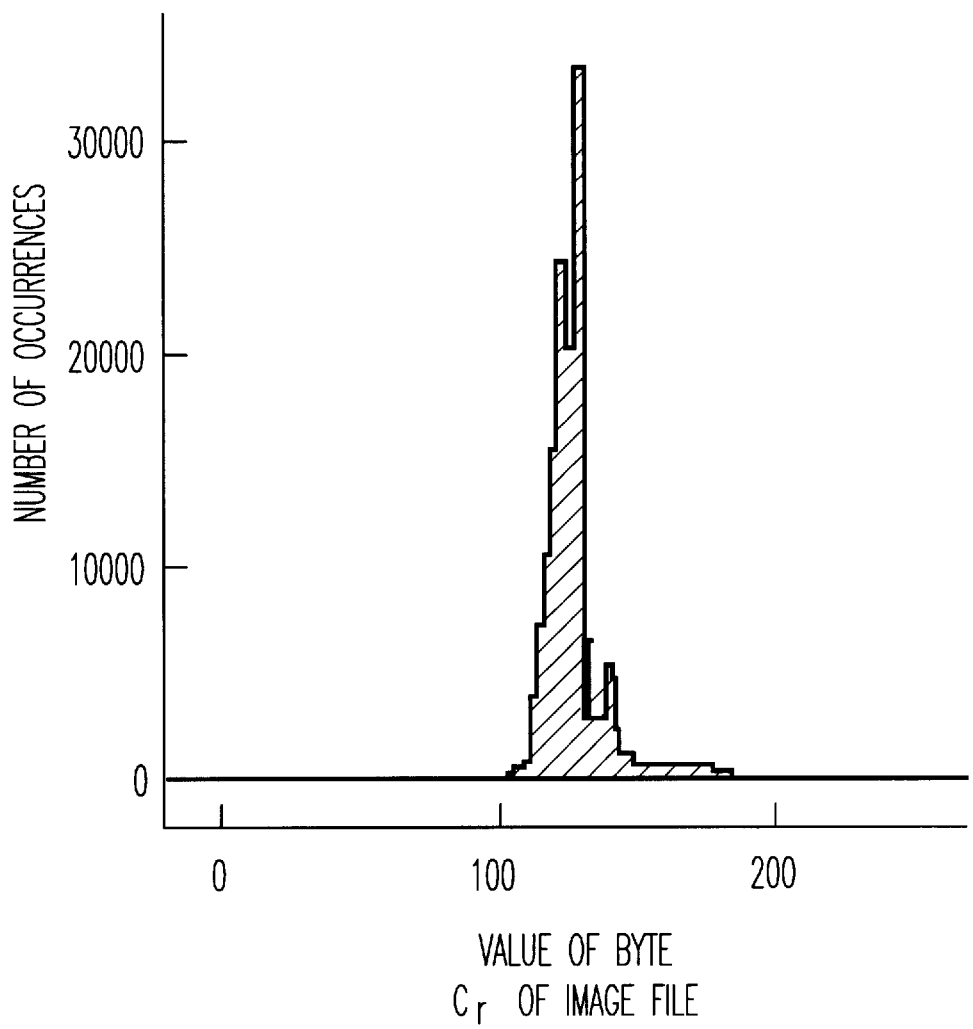
FIG. 9 is a histogram of the color difference signal Cr which is from a file used to generate the histograms of FIGS. 1 and 8.
Figure 10:
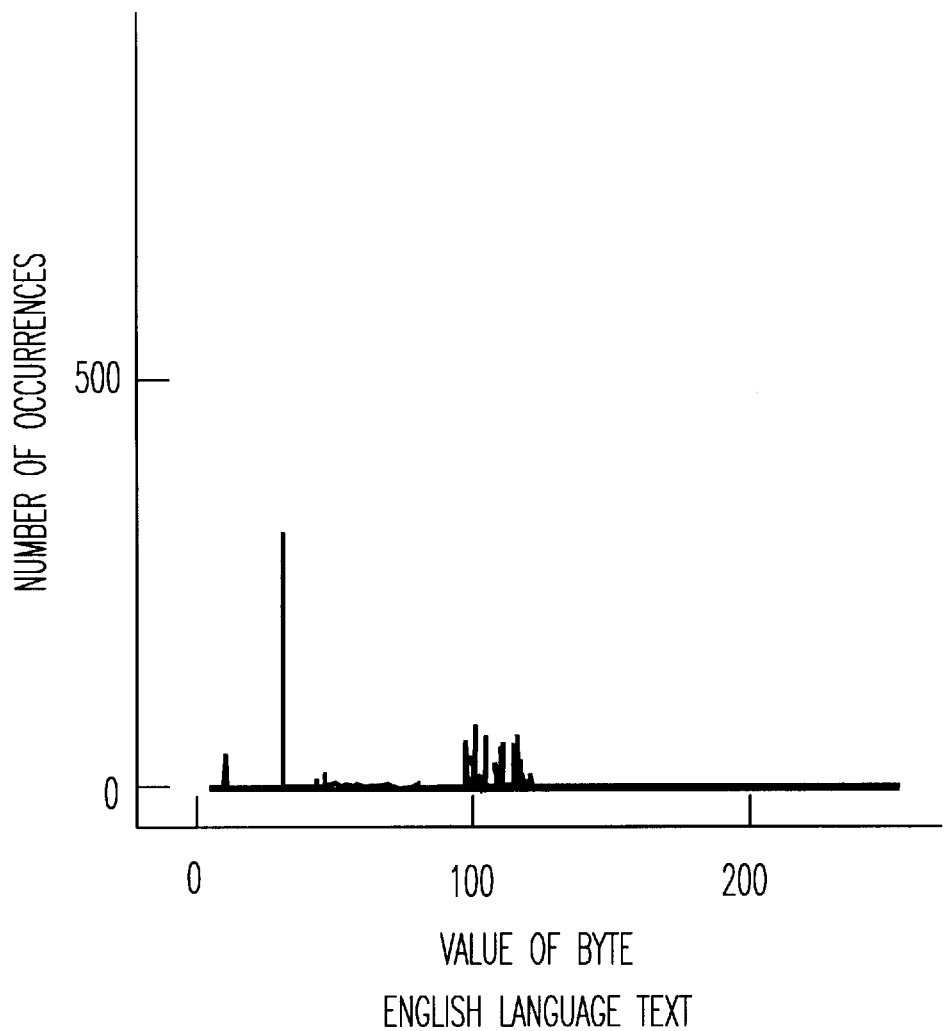
FIG. 10 is a histogram of a byte pattern occurring in an English language text file.
Figure 11:
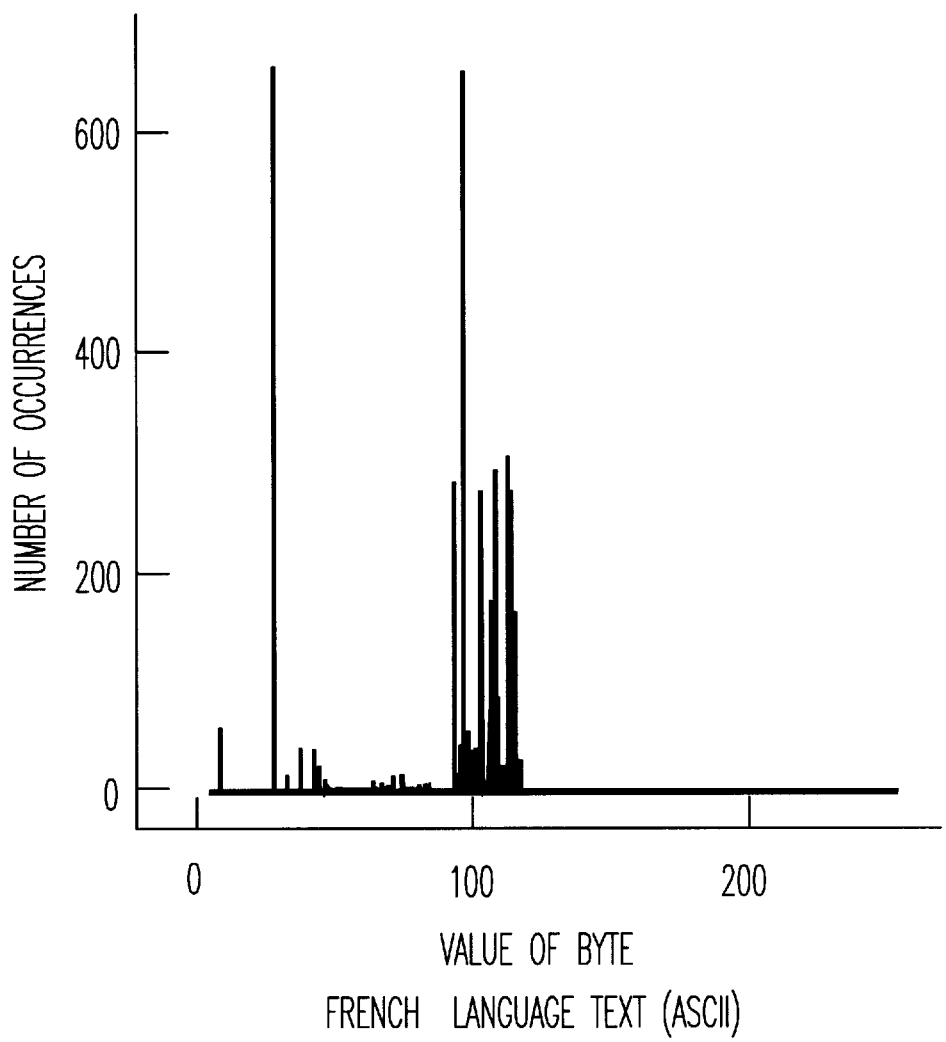
FIG. 11 is a histogram of the byte patterns occurring in a French language text file encoded using ASCII.
Figure 12:
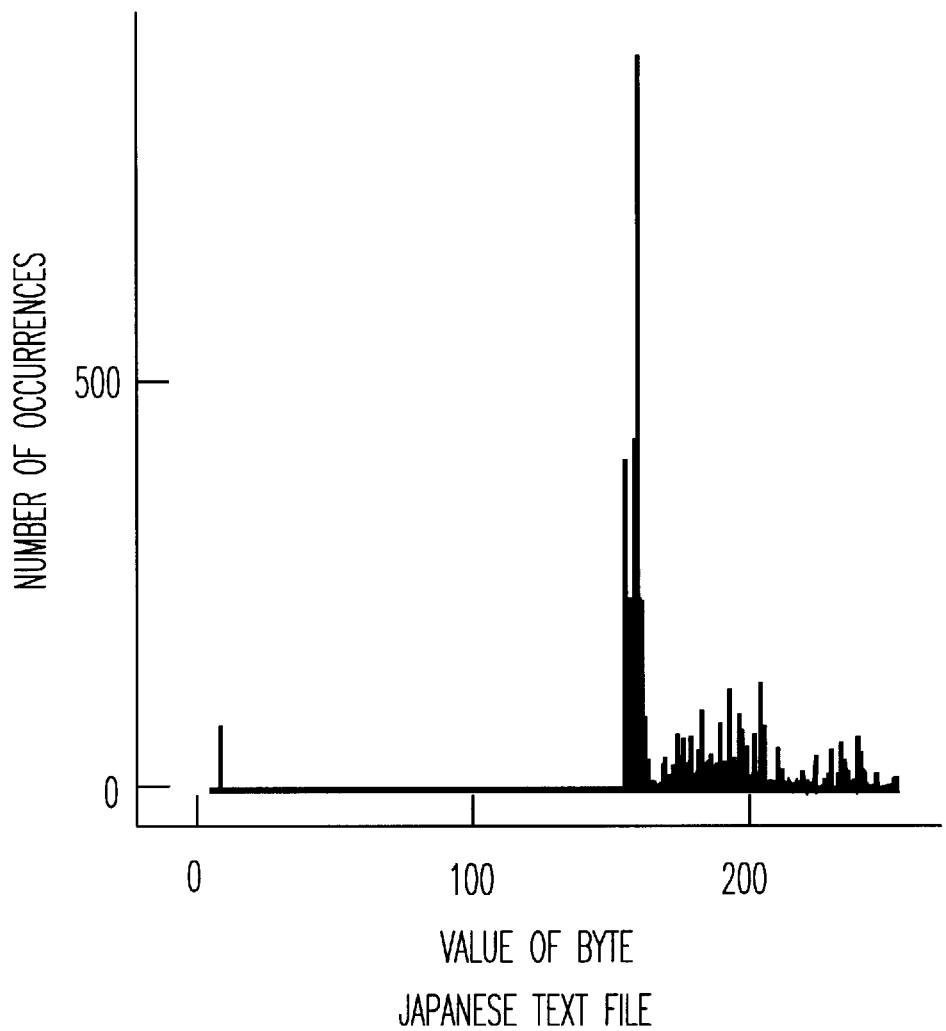
FIG. 12 is a histogram of the byte patterns occurring in a Japanese language text file.

Further exemplary histograms which can be processed by the present invention include the luminance or Y level histogram obtained from the same image as the histogram of the Cb representation of the image illustrated in FIG. 1. Further, the histogram illustrated in FIG. 9 is of the color difference signal Cr of the image represented in FIGS. 1 and 8. Generally, the byte values in an image file are used to represent intensity of the characteristic or color being analyzed. FIG. 10 illustrates a histogram of the byte patterns contained within an English language text file, FIG. 11 illustrates a histogram of the byte characters contained in a French language file represented using ASCII codes, and FIG. 12 represents a histogram of a Japanese language text. However, for the Japanese language text, two bytes are used to represent each character and the histogram of FIG. 12 is constructed utilizing only one of the bytes.

The present invention is applicable to any machine which needs to automatically determine an appropriate compression method. For example, the invention can be utilized for transmissions by facsimile machines, copiers, multi-function digital copier/printers, image retrieval systems, information retrieval systems, personal computers workstations, or image filing systems. When the present invention is used in a facsimile machine, information which is to be transmitted is examined utilizing the present invention in order to determine the optimum compression method to be used before transmission. When information is to be scanned using a digital copier, the scanned information is analyzed by the process of the present invention in order to determined the appropriate compression method. Further, the invention can be used when the image has been obtained through a scanner or another such as a floppy or optical disk, or through a communication network.

When an image is represented using a plurality of colors (e.g., Y, Cb, and Cr, or Black, Cyan, Magenta and Yellow), the invention will analyze one color, a plurality of colors, or all colors, as desired in order to determine the file type. The discovery of the use of a histogram in general in order to determine file type constitutes part of the invention. The invention can also be utilized to determined that a file is a font file when the byte values are above a threshold and grouped to the left (or at a lower value portion) of the histogram. Further, any desired or optimum compression methods can be used after the file type has been determined. Additionally, the invention includes using any one or a plurality of tests illustrated in the flowchart and also just determining file type without necessarily performing compressions thereafter.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits, including one or more programmable logic arrays or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMS, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A machine implemented method of analyzing a file, comprising the steps of:
   obtaining a file;
   determining a frequency of occurrence of bit patterns in the file;
   determining characteristics of the file by analyzing the frequency of occurrence of the bit patterns in the file;
   determining a number of byte values which have a frequency less than a predetermined threshold;
   determining a number of consecutive byte values which have a frequency less than the predetermined threshold; and determining the file is not an image file when the number of consecutive byte values which have a frequency less than the predetermined threshold exceeds a predetermined number.

2. A method according to claim 1, further comprising the step of:
  selecting an encoding method using the characteristics of the file which have been determined.

3. A method according to claim 2, further comprising the step of:
  encoding the file using the encoding method which has been selected.

4. A method according to claim 1, further comprising the step of:
  encoding the file using an encoding method for non-image files, when the image file is determined not be an image file.

5. A method according to claim 4, wherein the encoding step comprises:
  encoding the file using a Lempel-Ziv based encoding method.

6. A method according to claim 1, wherein the step of determining characteristics includes:
  determining if an average of the file is in a central portion of the frequency of occurrences.

7. A method according to claim 6, wherein the step of determining characteristics includes:
  determining the file is an image file when the average of the file is determined to be in a central portion of the frequency of occurrences.

8. A method according to claim 7, further comprising the step of:
  encoding the file using an image encoding method, when the file is determined to be an image file.

9. A method according to claim 8, wherein the encoding step comprises:
  encoding using one of a JPEG and JBIG based encoding methods.

10. A method according to claim 7, further comprising the step of:
  determining an image encoding method for the file using a number of bits used to represent portions of the file.

11. A method according to claim 10, wherein the step of determining the image encoding method comprises:
  determining the image encoding method is to be a JPEG based image encoding method, when the number of bits used to represent the portions of the file exceeds a predetermined number of bits.

12. A method according to claim 1, wherein the step of determining characteristics of the file comprises:
  analyzing a limited range of the bit patterns in the file.

13. A method according to claim 12, further comprising the steps of:
  determining an average bit pattern of the file; and
  determining a standard deviation of the bit patterns of the file,
  wherein the step of analyzing comprises:
  analyzing a limited range which is based on the average bit pattern of the file and the standard deviation of the bit patterns of the file.

14. A method according to claim 13, wherein the analyzing step comprises:
  analyzing the limited range which is the average bit pattern of the file, plus or minus three times the standard deviation of the bit patterns of the file.

15. A method according to claim 1, wherein the step of determining characteristics of the file comprises:
  determining the file is an image file when a predetermined consecutive number of bytes of the file are not less than a predetermined threshold, and the average value of bytes of the file is in a central portion of the bit patterns.

16. A method according to claim 15, further comprising the step of:
  compressing the file using an image compression method, when the file is determined to be an image file.

17. A method according to claim 16, further comprising the step of:
  compressing the file using a lossless compression method, when the file is not determined to be an image file.

18. A system for analyzing a file, comprising:
  means for determining a frequency of occurrence of bit patterns in a file;
  means for determining characteristics of the file by analyzing the frequency of occurrence of the bit patterns in the file;
  means for determining a number of byte values which have a frequency less than a predetermined threshold;
  means for determining a number of consecutive byte values which have a frequency less than the predetermined threshold; and
  means for determining the file is not an image file when the number of consecutive byte values which have a frequency less than the predetermined threshold exceeds a predetermined number.

19. A system according to claim 18, further comprising:
  means for selecting an encoding system using the characteristics of the file which have been determined.

20. A system according to claim 19, further comprising:
  means for encoding the file using the encoding method which has been selected.

21. A system according to claim 18, further comprising:
  means for encoding the file using an encoding method for non-image files, when the image file is determined not be an image file.

22. A system according to claim 21, wherein the means for encoding comprises:
  means for encoding the file using a Lempel-Ziv based encoding method.

23. A system according to claim 18, wherein the means for determining characteristics includes:
  means for determining if an average of the file is in a central portion of the frequency of occurrences.

24. A system according to claim 18, wherein the means for determining characteristics includes:
  means for determining the file is an image file when the average of the file is determined to be in a central portion of the frequency of occurrences.

25. A system according to claim 24, further comprising:
  means for encoding the file using an image encoding method, when the file is determined to be an image file.

26. A system according to claim 25, wherein the means for encoding comprises:
  means for encoding using one of a JPEG and JBIG based encoding methods.

27. A system according to claim 24, further comprising:
  means for determining an image encoding method for the file using a number of bits used to represent portions of the file.

28. A system according to claim 27, wherein the means for determining the image encoding method comprises:

means for determining the image encoding method is to be a JPEG based image encoding method, when the number of bits used to represent the portions of the file exceeds a predetermined number of bits.

29. A system according to claim 18, wherein the means for determining characteristics of the file comprises:

means for analyzing a limited range of the bit patterns in the file.

30. A system according to claim 29, further comprising:

means for determining an average bit pattern of the file; and means for determining a standard deviation of the bit patterns of the file, wherein the means for analyzing comprises:

means for analyzing a limited range which is based on the average bit pattern of the file and the standard deviation of the bit patterns of the file.

31. A system according to claim 30, wherein the means for analyzing comprises:

means for analyzing the limited range which is the average bit pattern of the file, plus or minus three times the standard deviation of the bit patterns of the file.

32. A system according to claim 18, wherein the means for determining characteristics of the file comprises:

means for determining the file is an image file when a predetermined consecutive number of bytes of the file are not less than a predetermined threshold, and the average value of bytes of the file is in a central portion of the bit patterns.

33. A system according to claim 32, further comprising:

means for compressing the file using an image compression method, when the file is determined to be an image file.

34. A system according to claim 33, further comprising:

means for compressing the file using a lossless compression method, when the file is not determined to be an image file.

35. A computer program product having a computer readable medium having computer program logic recorded thereon for analyzing a file, comprising:

means for determining a frequency of occurrence of bit patterns in a file; and means for determining a file type from a plurality of file types by analyzing the frequency of occurrence of the bit patterns in the file.

36. A computer program product according to claim 35, wherein the means for determining the file type comprises:

means for determining the file is an image file when a predetermined consecutive number of bytes of the file are not less than a predetermined threshold, and the average value of bytes of the file is in a central portion of the bit patterns.

37. A computer program product according to claim 35, further comprising:

means for compressing the file using an image compression method, when the file is determined to be an image file.

38. A computer program product according to claim 35, further comprising:

means for compressing the file using a lossless compression method, when the file is not determined to be an image file.

39. A computer program product according to claim 35, wherein the means for determining the file type determines the file type to be an image file type.

40. A computer program product according to claim 35, wherein the means for determining the file type determines the file type to be a font file type.

41. A computer program product according to claim 35, wherein the means for determining the file type determines the file type to be an executable file type.

42. A machine implemented method of analyzing a file, comprising the steps of:

obtaining a file;

determining a frequency of occurrence of byte patterns in the file; and determining a file type from a plurality of file types by analyzing the frequency of the byte patterns in the file.

43. A method according to claim 42, wherein the step of determining the file type determines the file type to be an image file type.

44. A method according to claim 42, wherein the step of determining the file type determines the file type to be a font file type.

45. A method according to claim 42, wherein the step of determining the file type determines the file type to be an executable file type.

46. A system for analyzing a file, comprising:

means for obtaining a file;

means for determining a frequency of occurrence of byte patterns in the file; and means for determining a file type from a plurality of file types by analyzing the frequency of the byte patterns in the file.

47. A system according to claim 46, wherein the means for determining the file type determines the file type to be an image file type.

48. A system according to claim 46, wherein the means for determining the file type determines the file type to be a font file type.

49. A system according to claim 46, wherein the means for determining the file type determines the file type to be an executable file type.

* * * * *